United States Patent
Nakasaka et al.

(10) Patent No.: US 12,530,479 B2
(45) Date of Patent: Jan. 20, 2026

(54) VERIFICATION METHOD, SERVER, AND RECORDING MEDIUM

(71) Applicant: Panasonic Intellectual Property Corporation of America, Torrance, CA (US)

(72) Inventors: Ayaka Nakasaka, Osaka (JP); Yuji Unagami, Osaka (JP); Kakuya Yamamoto, Hyogo (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 108 days.

(21) Appl. No.: 18/425,252

(22) Filed: Jan. 29, 2024

(65) Prior Publication Data
US 2024/0169083 A1    May 23, 2024

Related U.S. Application Data

(63) Continuation of application No. PCT/JP2022/028475, filed on Jul. 22, 2022.
(Continued)

(51) Int. Cl.
G06F 21/62    (2013.01)
G06F 21/64    (2013.01)

(52) U.S. Cl.
CPC .......... *G06F 21/6218* (2013.01); *G06F 21/64* (2013.01)

(58) Field of Classification Search
CPC ....... G06F 21/6218; G06F 21/64; G06F 16/27
See application file for complete search history.

(56) References Cited

U.S. PATENT DOCUMENTS 8,819,067 B2 *   8/2014  Youn ................. G06F 16/21
                                                  707/769
2018/0025181 A1 * 1/2018  Barinov ............. G06F 21/645
                                                  726/26
(Continued)

FOREIGN PATENT DOCUMENTS

CN    103810558 A  *  5/2014  ......... G06Q 10/0635
CN    114258527 A  *  3/2022  ......... G06F 11/1469
(Continued)

OTHER PUBLICATIONS

International Search Report (ISR) issued on Oct. 11, 2022 in International (PCT) Application No. PCT/JP2022/028475.
(Continued)

*Primary Examiner* — Michael R Vaughan
(74) *Attorney, Agent, or Firm* — Wenderoth, Lind & Ponack, L.L.P.

(57) ABSTRACT

A verification method includes: obtaining log information items generated in a device; storing the log information items in storage, and storing, in a blockchain, converted information items obtained by converting the log information items; and conducting, at a predetermined frequency, verification as to whether at least one of a target log information item or a target converted information item has been tampered with, based on the target log information item and the target converted information item, the target log information item being included in the log information items and targeted for verification, the target converted information item being included in the converted information items and corresponding to the target log information item. A higher frequency is determined as the predetermined frequency when a time point at which the target converted information item was stored in the blockchain is closer to a current time at which the verification is conducted.

8 Claims, 8 Drawing Sheets

Related U.S. Application Data

(60) Provisional application No. 63/228,772, filed on Aug. 3, 2021.

(56) References Cited

U.S. PATENT DOCUMENTS

| | | | | |
|---|---|---|---|---|
| 2018/0157700 | A1* | 6/2018 | Roberts | G06F 16/2365 |
| 2022/0405384 | A1* | 12/2022 | Courington | G06F 21/105 |
| 2024/0046269 | A1* | 2/2024 | Yamamoto | G06Q 20/401 |
| 2024/0086541 | A1* | 3/2024 | Kishikawa | G06F 21/57 |

FOREIGN PATENT DOCUMENTS

| | | | | |
|---|---|---|---|---|
| CN | 117716366 A | * | 3/2024 | G06F 16/27 |
| WO | WO-9750036 A1 | * | 12/1997 | G06F 21/51 |

OTHER PUBLICATIONS

Hirona Yasuda, "Achieving self-sovereign-type identity through blockchain in which "individual-oriented approach" facilitates data distribution", Information-technology Promotion Agency, Japan, 2021, with partial English translation.

Eiji Ikeda, et al., "Acceleration toward society that distributes and utilizes data by "blockchain × data jacket"", IEICE Technical Report, AI2017-25, pp. 43-47, 2018, with partial English translation & cited in the specification.

Vitalik Buterin, "Ethereum: A Next-Generation Smart Contract and Decentralized Application Platform", 2014.

Japanese Industrial Standard: JIS Q 0073 (2010)—Risk management—Vocabulary, with partial English translation.

* cited by examiner

FIG. 5

| Block position \ Level of importance | Low | Mid | High |
|---|---|---|---|
| High (a = 1/N) | Lv11 (x/N) | Lv12 (y/N) | Lv13 (z/N) |
| Mid (b = (N - 1)/2N) | Lv21 (x/(N - 1)/2N) | Lv22 (y/(N - 1)/2N) | Lv23 (z/(N - 1)/2N) |
| Low (d = (N - 1)/2N) | Lv31 (x/(N - 1)/2N) | Lv32 (y/(N - 1)/2N) | Lv33 (z/(N - 1)/2N) |

VERIFICATION METHOD, SERVER, AND RECORDING MEDIUM

CROSS REFERENCE TO RELATED APPLICATIONS

This is a continuation application of PCT International Application No. PCT/JP2022/028475 filed on Jul. 22, 2022, designating the United States of America, which is based on and claims priority of U.S. Provisional Patent Application No. 63/228,772 filed on Aug. 3, 2021. The entire disclosures of the above-identified applications, including the specifications, drawings and claims are incorporated herein by reference in their entirety.

FIELD

The present disclosure relates to a verification method, a server, and a recording medium.

BACKGROUND

Non Patent Literature (NPL) 1 discloses a technique based on a blockchain and a data jacket that is a method of sharing a value of data while concealing the data itself.

CITATION LIST

Non Patent Literature

NPL 1: Eiji Ikeda et al., *Acceleration Towards Data Distribution/Utilization Society by "Blockchain and Data Jacket"*, IEICE Technical Report, AI2017-25 (2018)

SUMMARY

Technical Problem

The present disclosure is to provide, for example, a verification method by which the amount of calculations necessary for tampering detection can be reduced.

Solution to Problem

A verification method according to an aspect of the present disclosure includes: sequentially obtaining, from a device, a plurality of log information items generated in the device as a result of the device operating; sequentially storing, in storage, the plurality of log information items, and sequentially storing, in a blockchain, a plurality of converted information items obtained by converting the plurality of log information items through a predetermined conversion; and conducting, at a predetermined frequency, verification as to whether at least one of a target log information item or a target converted information item has been tampered with, based on the target log information item and the target converted information item, the target log information item being included in the plurality of log information items and targeted for verification, the target converted information item being included in the plurality of converted information items and corresponding to the target log information item, wherein a higher frequency is determined as the predetermined frequency when a point in time at which the target converted information item was stored in the blockchain is closer to a current time at which the verification is conducted.

Note that these general or specific aspects may be implemented using a system, a device, an integrated circuit, a computer program, or a computer-readable recording medium such as a compact disk read-only memory (CD-ROM), or any combination of systems, devices, integrated circuits, computer programs, or recording media.

Advantageous Effects

According to the present disclosure, the amount of calculations necessary for tampering detection can be reduced.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 is a diagram illustrating an example of a table determining a predetermined frequency.

DESCRIPTION OF EMBODIMENTS

Circumstances Leading to the Present Disclosure

Figure 1:
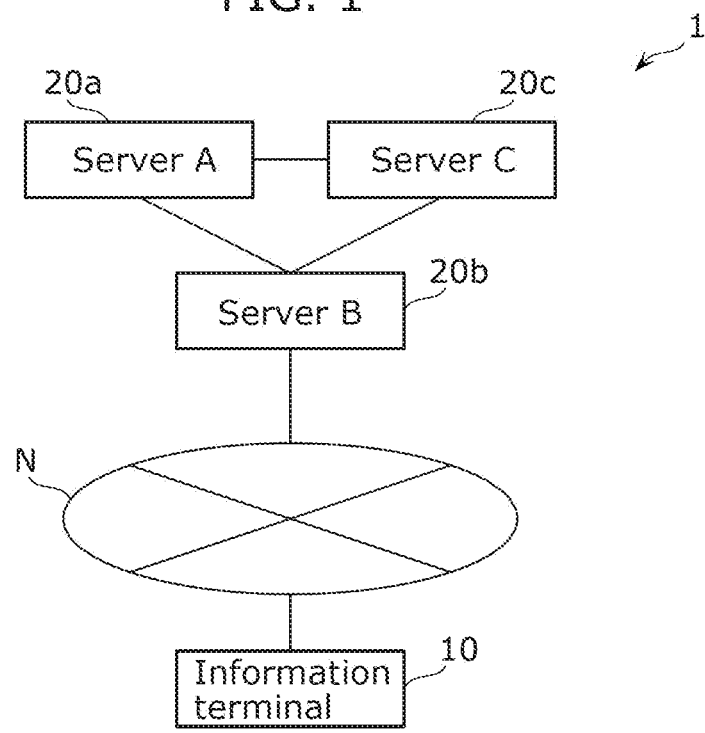
FIG. 1 is a diagram illustrating an example of a configuration of a data distribution system according to an embodiment.

In recent years, there is a growing social need for a system that enables personal data such as data related to healthcare or the like to be distributed between businesses and blockchain technology is garnering attention as means for improving tamper resistance of the system. Recording logs of various operations such as downloading data from a data distribution system in both a database and a blockchain can make tampering difficult. While tampering detection is conceivably verified by comparing operation logs respectively recorded in the database and the blockchain with each other, verifying all recorded operation logs at a high frequency increases an amount of calculations necessary for the verification over time and becomes a problem during a long-term operation. Therefore, the present inventors have found a verification method by which the amount of calculations necessary for tampering detection can be reduced by efficiently selecting, under conditions in which operation logs of a system increase over time, a log that is targeted for verification in accordance with a type of an operation log and a time-series data structure of a blockchain.

A verification method according to a first aspect of the present disclosure is a verification method including: sequentially obtaining, from a device, a plurality of log information items generated in the device as a result of the device operating; sequentially storing, in storage, the plurality of log information items, and sequentially storing, in a blockchain, a plurality of converted information items obtained by converting the plurality of log information items through a predetermined conversion; and conducting, at a predetermined frequency, verification as to whether at least one of a target log information item or a target converted information item has been tampered with, based on the target log information item and the target converted information item, the target log information item being included in the plurality of log information items and targeted for verification, the target converted information item being included in the plurality of converted information items and corresponding to the target log information item, wherein a higher frequency is determined as the predetermined frequency when a point in time at which the target converted information item was stored in the blockchain is closer to a current time at which the verification is conducted.

Accordingly, since verification of a target converted information item is conducted at a higher frequency when a point in time at which the target converted information item was stored in the blockchain is closer to a current time at which the verification is conducted, a frequency of verification of old target converted information items with a lower risk of being tampered with can be reduced. Therefore, since verification can be conducted in accordance with a risk of being tampered with, the number of verifications can be reduced so as to prevent the risk of being tampered with from increasing. Accordingly, the amount of calculations necessary for verification can be reduced.

A verification method according to a second aspect of the present disclosure is the verification method according to the first aspect, wherein a higher frequency is determined as the predetermined frequency when a position, in the blockchain, of a first block including the target converted information item is closer to a second block connected last to the blockchain.

Accordingly, since verification of a target converted information item is conducted at a higher frequency when a point in time at which the target converted information item was stored in the blockchain is closer to a current time at which the verification is conducted, a frequency of verification of old target converted information items with a lower risk of being tampered with can be reduced.

A verification method according to a third aspect of the present disclosure is the verification method according to the first aspect, wherein each of the plurality of log information items is classified into a level of importance among a plurality of levels of importance, the plurality of levels of importance being determined in advance for attributes of the plurality of log information items, and a higher frequency is further determined as the predetermined frequency when the level of importance is higher.

Accordingly, since a level of importance of affecting the predetermined frequency is set for each attribute of log information, the higher a risk exposure of a log information item due to tampering, the higher the frequency at which verification of the log information item can be conducted.

A verification method according to a fourth aspect of the present disclosure is the verification method according to the first aspect, wherein each of the plurality of log information items is classified into a level of importance among a plurality of levels of importance, the plurality of levels of importance being determined in advance for attributes of the plurality of log information items, and a higher frequency is determined as the predetermined frequency when a position, in the blockchain, of a first block including the target converted information item is closer to a second block connected last to the blockchain and when the level of importance is higher.

Accordingly, since verification of a target converted information item is conducted at a higher frequency when the converted information item is included in a block in which a point in time at which the target converted information item was stored in the blockchain is closer to a current time at which the verification is conducted, a frequency of verification of old target converted information items with a lower risk of being tampered with can be reduced. Moreover, since a level of importance of affecting the predetermined frequency is set for each attribute of log information, the higher a risk exposure of a log information item due to tampering, the higher the frequency at which verification of the log information item can be conducted.

A verification method according to a fifth aspect of the present disclosure is the verification method according to the fourth aspect, wherein the predetermined frequency is determined according to a table, and the table is represented by a plurality of frequencies corresponding to a plurality of sets of (i) one of a plurality of ranges each classified according to a relative position in the blockchain and (ii) a level of importance among the plurality of levels of importance.

Therefore, the predetermined frequency can be determined by referring to the table.

A verification method according to a sixth aspect of the present disclosure is the verification method according to the fifth aspect, wherein a smart contract for performing update processing is stored in the blockchain, the update processing being processing of updating the plurality of frequencies that are set in the table and being performed when a block including transaction data for updating the table is stored in the blockchain.

Accordingly, the table can be automatically updated using a smart contract when transaction data is stored in the blockchain. In addition, since updating the table results in updating the predetermined frequency, a processing load necessary for the processing of updating the predetermined frequency can be reduced.

A verification method according to a seventh aspect of the present disclosure is the verification method according to the first through sixth aspects, wherein the conducting of the verification includes: generating a converted information item for verification, by converting the target log information item through the predetermined conversion; making a comparison between the converted information item for verification and the target converted information item stored in the blockchain; determining that the target log information item and the target converted information item are not tampered with when the comparison shows that the converted information item for verification and the target converted information item match each other; and determining that at least one of the target log information item or the target converted information item has been tampered with when the comparison shows that the converted information item for verification and the target converted information item do not match each other.

A verification method according to an eighth aspect of the present disclosure is the verification method according to the seventh aspect, wherein the predetermined conversion is a reproducible method by which a first value is uniquely converted into a second value that forms a pair with the first value, and is an irreversible conversion by which the second value cannot be converted into the first value.

Therefore, anonymity of data stored in an open blockchain for verifying data stored in the database can be enhanced.

A server according to a ninth aspect of the present disclosure is a server including: a processor; and memory, wherein, using the memory, the processor: sequentially obtains, from a device, a plurality of log information items generated as a result of the device operating; sequentially stores, in storage, the plurality of log information items, and sequentially stores, in a blockchain, a plurality of converted information items obtained by converting the plurality of log information items through a predetermined conversion; and conducts, at a predetermined frequency, verification as to whether at least one of a target log information item or a target converted information item has been tampered with, based on the target log information item and the target converted information item, the target log information item being included in the plurality of log information items and targeted for verification, the target converted information item being included in the plurality of converted information items and corresponding to the target log information item, and a higher frequency is determined as the predetermined frequency when a point in time at which the target converted information item was stored in the blockchain is closer to a current time.

Accordingly, since verification of a target converted information item is conducted at a higher frequency when a point in time at which the target converted information item was stored in the blockchain is closer to a current time at which the verification is conducted, a frequency of verification of old target converted information items with a lower risk of being tampered with can be reduced. Therefore, since verification can be conducted in accordance with a risk of being tampered with, the number of verifications can be reduced so as to prevent the risk of being tampered with from increasing. Accordingly, the amount of calculations necessary for verification can be reduced.

Note that these general or specific aspects may be implemented using a system, a device, an integrated circuit, a computer program, or a computer-readable recording medium such as a CD-ROM, or any combination of systems, devices, integrated circuits, computer programs, or recording media.

EMBODIMENT

Outline

Blockchain systems are also well known as a core technology of the cryptocurrency Bitcoin and include a plurality of nodes to participate in a peer-to-peer network. Each node possesses a ledger on which data can be recorded and, by mutually verifying and synchronizing ledgers between a plurality of nodes, consistency of ledgers across the entire blockchain system is guaranteed.

Through the ledgers, the plurality of nodes can view log data and register and execute a program on the blockchain system. In particular, the program is referred to as a smart contract. An execution condition of the smart contract or processing contents on the blockchain of the smart contract are defined and registered in the blockchain. Accordingly, triggered by storage of transaction data being a request from a node in the blockchain, a program of the smart contract is automatically executed on a ledger in the blockchain system.

Transaction data and data of the smart contract at this point are stored in units called blocks. By performing hashing in which a block is converted using a cryptographic hash function, a hash value is generated. A hash value is a unique value with respect to original data subjected to a cryptographic hash function and, at the same time, a value that does not allow the original data to be restored from the hash value. The hash value of a block is stored in a block that is generated next. By sequentially repeating the processing, a blockchain with a time-series chain structure is updated on a plurality of ledgers in the entire network.

Since a blockchain has a time-series chain structure as described above, in order to tamper with one data item on a ledger, not only the block in question but the continuously-increasing blocks subsequent to the block in question must be rewritten on a majority of the ledgers on the network. This is why blockchains are considered highly resistant to data tampering. Due to such high tampering resistance, blockchains are being utilized across a wide range of industries including finance and manufacturing. Furthermore, with recent expansions of the digital market, it is suggested that blockchains are effective with respect to "data distribution systems" which distribute necessary data from a data owner to a business that desires to utilize the data.

[Data Distribution System]

FIG. 1 is a diagram illustrating an example of a configuration of a data distribution system according to an embodiment.

As illustrated in FIG. 1, for example, data distribution system 1 according to the present disclosure includes information terminal 10 operated by a user and a plurality of servers 20a to 20c. These components are connected by network N. While examples of network N include the Internet and a mobile phone carrier network, network N may be constituted of any kind of communication line or network.

Hereinafter, while each of servers 20a to 20c will also be referred to as server 20, servers 20a to 20c may also be referred to as servers A to C.

For example, to a user who accesses data distribution system 1 from a browser of information terminal 10, data distribution system 1 provides five functions, namely, system login, system logout, data upload, data download, and authority setting of user. Data distribution system 1 provides a function in accordance with a request by information terminal 10. In addition, data distribution system 1 generates an operation log that is a history of functions provided to information terminal 10 and records the generated operation log in database 21. Since the operation log is associated with a user ID, the operation log includes the user ID. For example, data distribution system 1 hashes the user ID included in the operation log and records log transaction data including hashed converted information in blockchain 22.

In addition, when the function of uploading or downloading raw data is executed, data distribution system 1 stores the raw data in database 21 and stores log transaction data including a hash value (converted information) obtained by hashing the raw data in blockchain 22. Even when the function of uploading or downloading raw data is executed, data distribution system 1 hashes the user ID included in the operation log of the upload or download and records log transaction data including hashed converted information in blockchain 22.

For example, Ethereum may be adopted as a blockchain platform and, for example, given that a network maintained by nodes with vested interests such as a plurality of businesses is expected to adopt a block generation rule which is based on the nodes having equal authority and which enables tampering resistance to be readily maintained, Proof of Work may be adopted as a consensus algorithm. Block generation is performed approximately every 15 seconds regardless of a frequency of issuance of transaction data.

[Information Terminal 10]

Information terminal 10 receives an operation by the user and transmits a request in accordance with the operation to servers 20a to 20c. Information terminal 10 transmits, to servers 20a to 20c, requests for causing servers 20a to 20c to execute the five functions, namely, system login, system logout, data upload, data download, and authority setting of user. When requesting upload of data, information terminal 10 transmits data targeted for upload to servers 20a to 20c. Information terminal 10 is an example of a device. A request is information generated in information terminal 10 as a result of information terminal 10 performing an operation, and represents an example of log information. A request may be described as information (operation history) generated by information terminal 10 when information terminal 10 is operated by the user. A request includes a user ID. Information terminal 10 sequentially transmits, to server 20, a plurality of log information items generated by information terminal 10 as a result of information terminal 10 operating.

Figure 2:
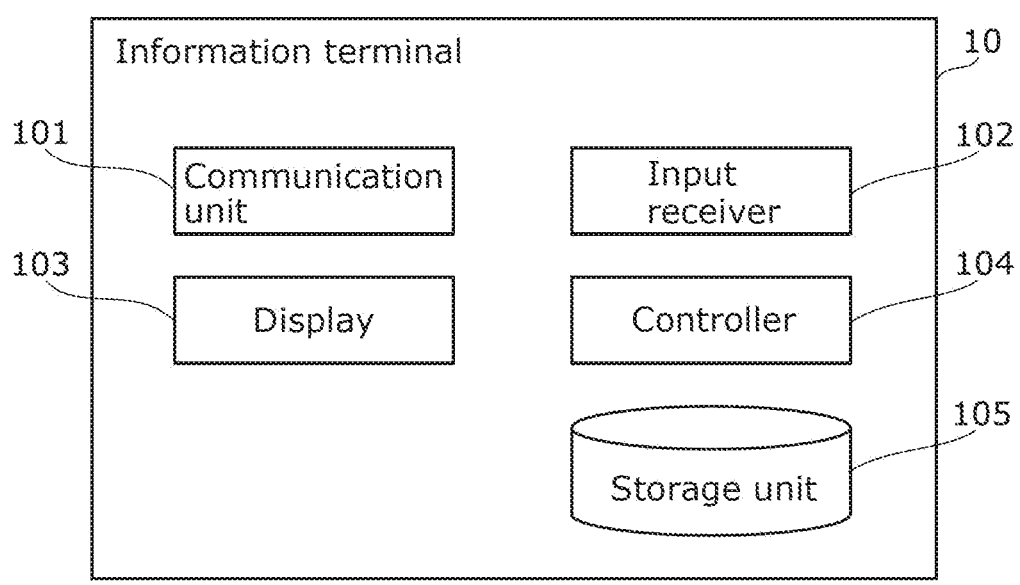
FIG. 2 is a diagram illustrating an example of a configuration of an information terminal according to the embodiment.

FIG. 2 is a diagram illustrating an example of a configuration of an information terminal according to the embodiment.

Information terminal 10 includes communication unit 101, input receiver 102, display 103, controller 104, and storage unit 105.

Communication unit 101 transmits information to server 20 and receives information from server 20 via network N. Examples of information transmitted to server 20 include a request to have server 20 execute a function of server 20 and data to be uploaded. Examples of information received from server 20 include data downloaded from server 20. Every time a request is generated, communication unit 101 transmits the generated request to server 20. When there is data to be updated, communication unit 101 transmits the data to server 20 together with the generated request.

In this manner, communication unit 101 performs communication with servers 20a to 20c via network N. Note that the communication may be performed based on transport layer security (TLS) and an encryption key for TLS communication may be held by communication unit 101.

Input receiver 102 receives information input by an operation by the user. Input receiver 102 displays the received information input on display 103, transmits the received information input to controller 104, and transmits the received information input to communication unit 101.

In the present embodiment, input receiver 102 receives information input indicating a selection of a request for a function to be executed by server 20 by an operation by the user. Input receiver 102 transmits the received selection and an electronic signature of the user to controller 104. In addition, due to an operation by the user, input receiver 102 receives information to the effect that a notification displayed on display 103 has been confirmed. When uploading data to server 20, input receiver 102 may receive selection of data to be uploaded. When downloading data from server 20, input receiver 102 may receive selection of data to be downloaded.

Display 103 displays a UI for receiving an input by input receiver 102. In addition, display 103 displays, on the UI, information input received by input receiver 102. Display 103 may display information notified from server 20.

Controller 104 generates a request based on information input received by input receiver 102 and transmits the generated request to server 20 via communication unit 101.

Storage unit 105 stores data that may be targeted for uploading. Storage unit 105 stores downloaded data.

Information terminal 10 can be implemented by a processor executing a predetermined program using memory.

[Server 20]

Figure 3:
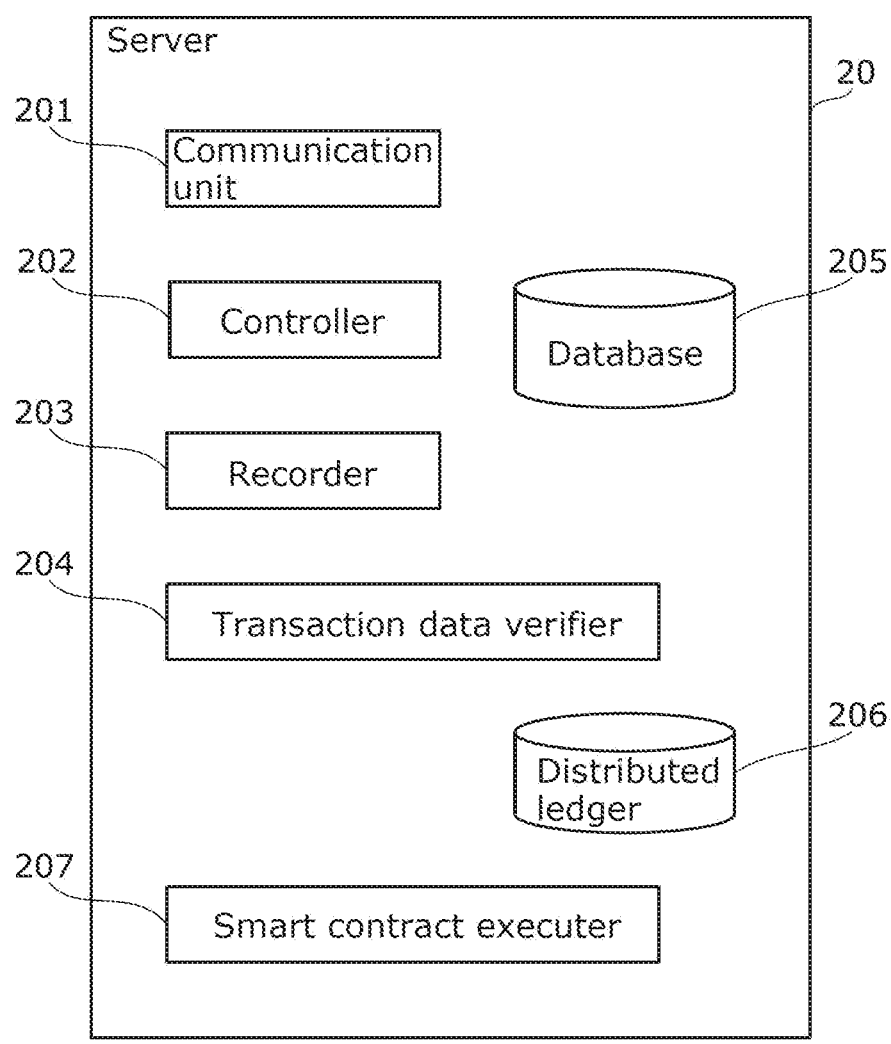
FIG. 3 is a diagram illustrating an example of a configuration of a server according to the embodiment.

FIG. 3 is a diagram illustrating an example of a configuration of a server according to the embodiment.

As illustrated in FIG. 3, server 20 includes communication unit 201, controller 202, recorder 203, transaction data verifier 204, database 205, distributed ledger 206, and smart contract executer 207.

Communication unit 201 transmits information to information terminal 10 and receives information from information terminal 10 via network N. Examples of information transmitted to information terminal 10 include data for which a request to server 20 to download the data has been received. Examples of information received from information terminal 10 include a request to have server 20 execute a function of server 20 and data to be uploaded to server 20.

In addition, communication unit 201 performs communication with other servers 20 via network N. Communication unit 201 transmits and receives transaction data to and from other servers 20.

In this manner, communication unit 201 performs communication with information terminal 10 via network N. Note that the communication may be performed based on transport layer security (TLS) and an encryption key for TLS communication may be held by communication unit 201.

As described above, information terminal 10 sequentially transmits, to server 20, a plurality of log information items generated by information terminal 10 as a result of information terminal 10 operating, and thus, communication unit 201 sequentially obtains the plurality of log information items from information terminal 10. The plurality of log information items obtained are sequentially stored in database 205.

Controller 202 converts a plurality of obtained log information items into a plurality of converted information items through a predetermined conversion. The predetermined conversion is a reproducible method by which a first value is uniquely converted into a second value that forms a pair with the first value, and is an irreversible conversion by which the second value cannot be converted into the first value. For example, the predetermined conversion is hashing.

Controller 202 performs the predetermined conversion on the plurality of log information items to generate a plurality of converted information items. In other words, controller 202 performs the predetermined conversion on each of the plurality of log information items to generate each converted information item. Controller 202 generates transaction data including the generated converted information items and executes a consensus algorithm for the generated transaction data. Accordingly, controller 202 sequentially stores the plurality of converted information items in the blockchain.

Controller 202 conducts, at a predetermined frequency, verification as to whether at least one of a target log information item or a target converted information item has been tampered with, based on the target log information item and the target converted information item. Here, the target log information item is a log information item that is included in the plurality of log information items stored in database 205 and is targeted for verification, and the target converted information item is a converted information item that is included in the plurality of converted information items stored in the blockchain and corresponds to the target log information item. In other words, the target converted information is information generated when server 20 obtains target log information and controller 202 performs a predetermined conversion on the target log information.

In the verification, by converting the target log information item through the predetermined conversion, controller 202 generates a converted information item for verification separate from the target converted information item already stored in the blockchain. Then, controller 202 makes a comparison between the converted information item for verification and the target converted information item stored in the blockchain. Controller 202 determines that the target log information item and the target converted information item are not tampered with when the comparison shows that the converted information item for verification and the target converted information item match each other, and determines that at least one of the target log information item or the target converted information item has been tampered with when the comparison shows that the converted information item for verification and the target converted information item do not match each other.

Controller 202 dynamically changes a predetermined frequency of conducting verification according to target log information. In tampering of log information, an effect of tampering of log information that is more directly linked to wrongdoing is conceivably large. In the case of the five functions of server 20 described earlier, compared to tampering with login and logout, tampering with an authority setting of the user and tampering with log information on uploading and downloading data which have a direct bearing on serious incidents such as personal information leakage can be described as having a higher risk exposure. The risk exposure is based on an operation type and is therefore a static parameter that remains unchanged after log generation.

As described above, the risk exposure of tampering may change in accordance with an attribute of a target log information item. Therefore, controller 202 may determine a predetermined frequency at which verification is conducted such that the higher a level of importance determined in advance for each attribute of log information, the higher the frequency. Each of the plurality of log information items is classified into a level of importance among a plurality of levels of importance, for each of the attributes of the plurality of log information items. The log information may include a flag that indicates an attribute. For example, an attribute is information indicating the five functions of system login, system logout, data upload, data download, and authority setting of user.

For example, log information items of upload and download are classified into a high level of importance, authority setting is classified into a middle level of importance, and login and logout are classified into a low level of importance. The high level of importance is a higher level of importance than the middle level of importance, and the middle level of importance is a higher level of importance than the low level of importance. The classification of levels of importance described above is not limited to three levels and may be determined to be two levels or four or more levels.

In addition, transaction data including log information is recorded in the blockchain in a pair with respect to corresponding log information as data of a verification destination to be used for tampering detection of database 205. Therefore, when tampering with data, an attacker must tamper with a suite including the log information in database 205, a block including converted information to form a pair with the log information, and blocks subsequent to the block including the converted information. Tampering resistance of a blockchain derives from the necessity to rewrite continuously-increasing subsequent blocks and the relatively newer a block number indicating a position of the block storing the converted information, the higher a frequency of risk occurrence. The relative newness of a block number is a dynamic parameter that can be represented by a ratio of the block number to a latest block number and, for example, the block number is updated once every 15 seconds with an update of the blockchain.

As described above, the frequency of risk occurrence of tampering may change in accordance with a newness of a block in which target converted information corresponding to target log information is stored. Thus, controller 202 determines a higher frequency as the predetermined frequency at which to conduct the verification, when a position, in the blockchain, of a first block including the target converted information item corresponding to the target log information item is closer to a second block connected last to the blockchain.

For example, controller 202 may determine that, among a plurality of converted information items stored in the blockchain, a plurality of first converted information items are to be verified at a first frequency, a plurality of second converted information items are to be verified at a second frequency, and a plurality of third converted information items are to be verified at a third frequency. The first frequency is a higher frequency than the second frequency, and the second frequency is a higher frequency than the third frequency. For example, the plurality of first converted information items are converted information items stored in the blockchain on a latest date among the plurality of converted information items. For example, the plurality of second converted information items are converted information items stored during a first period among the plurality of remaining converted information items stored prior to the latest date (in other words, the plurality of remaining converted information items excluding the plurality of first converted information items). For example, the plurality of third converted information items are the plurality of remaining converted information items stored during a second period prior to the first period (in other words, the plurality of remaining converted information items excluding the plurality of first converted information items and the plurality of second converted information items).

Figure 4:
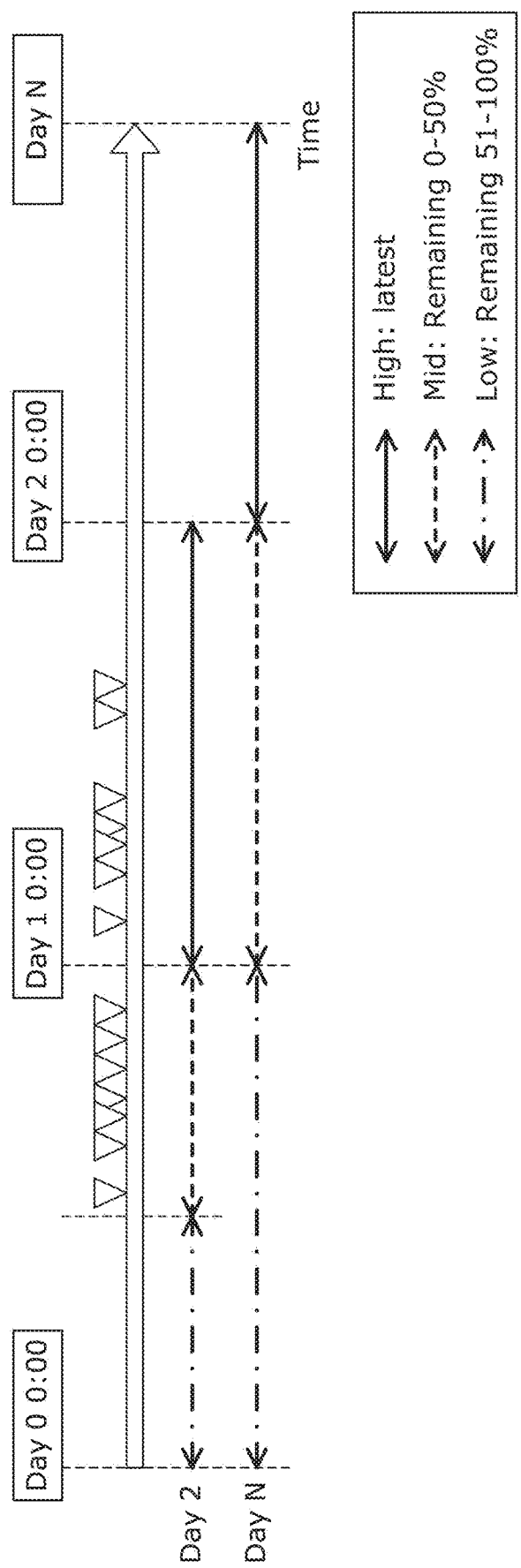
FIG. 4 is a diagram illustrating block positions in a blockchain.

FIG. 4 is a diagram illustrating block positions in a blockchain. Note that in FIG. 4, a down-pointing triangle indicates a point in time at which converted information corresponding to log information has been generated.

For example, on Day 2, the plurality of converted information items included in a block stored on Day 2 are all set to high (plurality of first converted information items). In addition, among a block stored prior to Day 1, a newer half of converted information items is set to mid (plurality of second converted information items) and an older half of converted information items is set to low (plurality of third converted information items).

Furthermore, on Day N, the plurality of converted information items included in a block stored on Day N are all set to high (plurality of first converted information items). In addition, among a block stored prior to Day N, a newer half of converted information items is set to mid (plurality of second converted information items) and an older half of converted information items is set to low (plurality of third converted information items).

The classification of relative positions in a blockchain of a plurality of converted information items described above is not limited to three levels and may be determined to be two levels or four or more levels.

FIG. 5 is a diagram illustrating an example of a table determining the predetermined frequency.

As illustrated in FIG. 5, the predetermined frequency is determined according to a table. The table is represented by a plurality of frequencies corresponding to a plurality of sets of (i) one of a plurality of ranges each classified according to a relative position in the blockchain and (ii) a level of importance among the plurality of levels of importance. Specifically, as illustrated in FIG. 5, the table indicates a level representing a frequency in accordance with a combination of a level of importance that affects a risk exposure and a block position that affects a frequency of risk occurrence. Levels Lv11, Lv12, Lv13, Lv21, Lv22, Lv23, Lv31, Lv32, and Lv33 may be equal to each other when occupying adjacent cells in the table or a frequency indicated by each level may be determined such that the higher the level of importance, the higher the frequency and the newer the block position, the higher the frequency. For example, Lv11, Lv12, and Lv13 may be determined to be a high frequency, Lv22 and Lv23 may be determined to be a middle frequency, and Lv21, Lv31, Lv32, and Lv33 may be determined to be a low frequency. Note that the high frequency is a higher frequency than the middle frequency, and the middle frequency is a higher frequency than the low frequency. The frequencies are not limited to three levels as described above and may be determined to be two levels or four or more levels.

Note that log information may include a flag for specifying a set to be classified according to the table.

Let us now return to the description of FIG. 3.

When communication unit 201 receives transaction data, transaction data verifier 204 verifies validity of the transaction data. For example, transaction data verifier 204 verifies whether or not an electronic signature generated by a correct method is added to the transaction data received by communication unit 201. Note that the verification may be skipped.

In addition, transaction data verifier 204 executes a consensus algorithm for building a consensus on the validity of the transaction data with a plurality of other servers 20.

In this case, as the consensus algorithm, practical byzantine fault tolerance (PBFT) may be used or other known consensus algorithms may be used. Examples of known consensus algorithms include PoW (Proof of Work) and PoS (Proof of Stake). When PBFT is used as the consensus algorithm, transaction data verifier 204 receives a report indicating whether or not verification of transaction data has succeeded from each of the plurality of servers 20 and determines whether or not the number of reports has exceeded a predetermined number. When the number of reports has exceeded a predetermined number, transaction data verifier 204 may determine that the validity of the transaction data has been verified by the consensus algorithm.

When transaction data verifier 204 confirms the validity of transaction data, transaction data verifier 204 causes recorder 203 to record the transaction data.

In the present embodiment, transaction data verifier 204 verifies the validity of the transaction data received by communication unit 201.

Note that recorder 203 records transaction data of which the validity has been verified by transaction data verifier 204 by including the transaction data in a block and storing the block in distributed ledger 206.

Note that recorder 203 may be constructed inside distributed ledger 206.

A plurality of log information items are stored in database 205. Database 205 is implemented by storage.

Transaction data is stored in distributed ledger 206. Since distributed ledger 206 sequentially obtains and stores transaction data, one or more transaction data items are stored in distributed ledger 206. Distributed ledger 206 is implemented by storage.

Smart contract executer 207 puts a smart contract in operation by executing a contract code or the like included in the transaction data stored in the blockchain in distributed ledger 206. By putting an update smart contract in operation, smart contract executer 207 may perform update processing of updating a table determining the predetermined frequency to a level designated by update transaction data. Smart contract executer 207 may perform update processing when a block including the update transaction data is added to the blockchain in distributed ledger 206.

As described above, smart contract executer 207 can manage update processing with the distributed ledger by putting a smart contract in operation. For example, it is assumed that an update smart contract has been generated by an application of information terminal 10 based on an operation by the user and a block including the smart contract has been stored in the blockchain in advance. That is to say, a contract code of an update smart contract for performing update processing is stored in the blockchain. Here, the update processing is processing of updating the plurality of frequencies that are set in the table and is performed when a block including update transaction data for updating the table is stored in the blockchain.

[Operation]

Next, operations of data distribution system 1 configured as described above will be explained.

Figure 6:
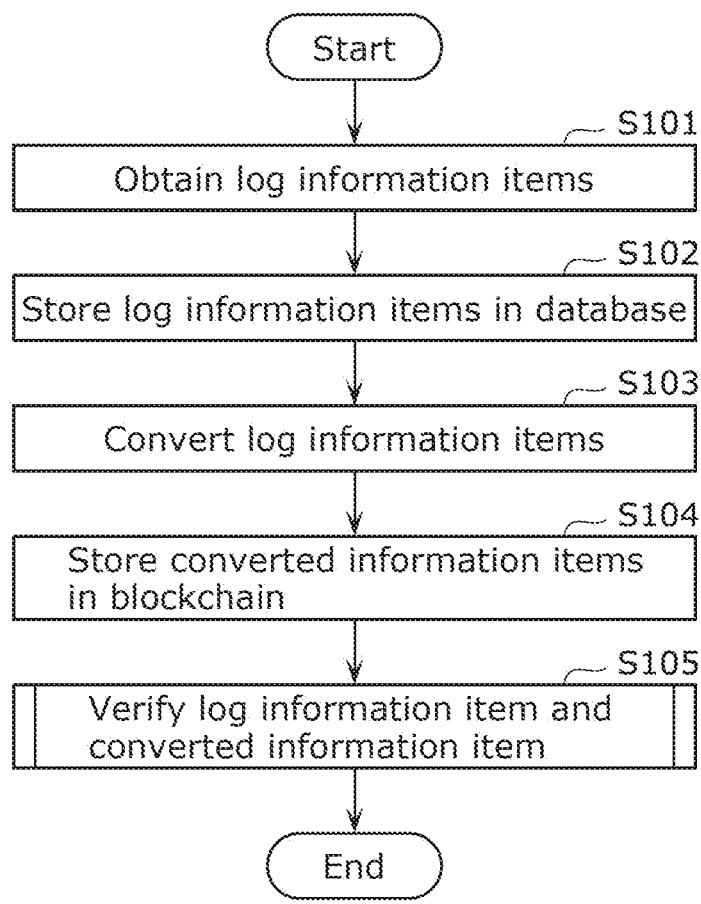
FIG. 6 is a flow chart illustrating an example of operations of the data distribution system according to the embodiment.

FIG. 6 is a flow chart illustrating an example of operations of the data distribution system according to the embodiment.

Server 20 sequentially obtains a plurality of log information items from information terminal 10 (S101).

Next, server 20 stores the plurality of log information items in database 205 (S102).

Next, server 20 converts the plurality of log information items obtained into a plurality of converted information items through a predetermined conversion (S103).

Next, server 20 generates transaction data including the generated converted information items and executes a consensus algorithm on the generated transaction data with other servers 20 to sequentially store the plurality of converted information items in the blockchain (S104).

Next, server 20 conducts, at a predetermined frequency, verification as to whether at least one of a target log information item or a target converted information item has been tampered with, based on the target log information item and the target converted information item (S105). Here, the target log information item is a log information item that is included in the plurality of log information items stored in database 205 and is targeted for verification, and the target converted information item is a converted information item included in the plurality of converted information items stored in the blockchain.

Figure 7:
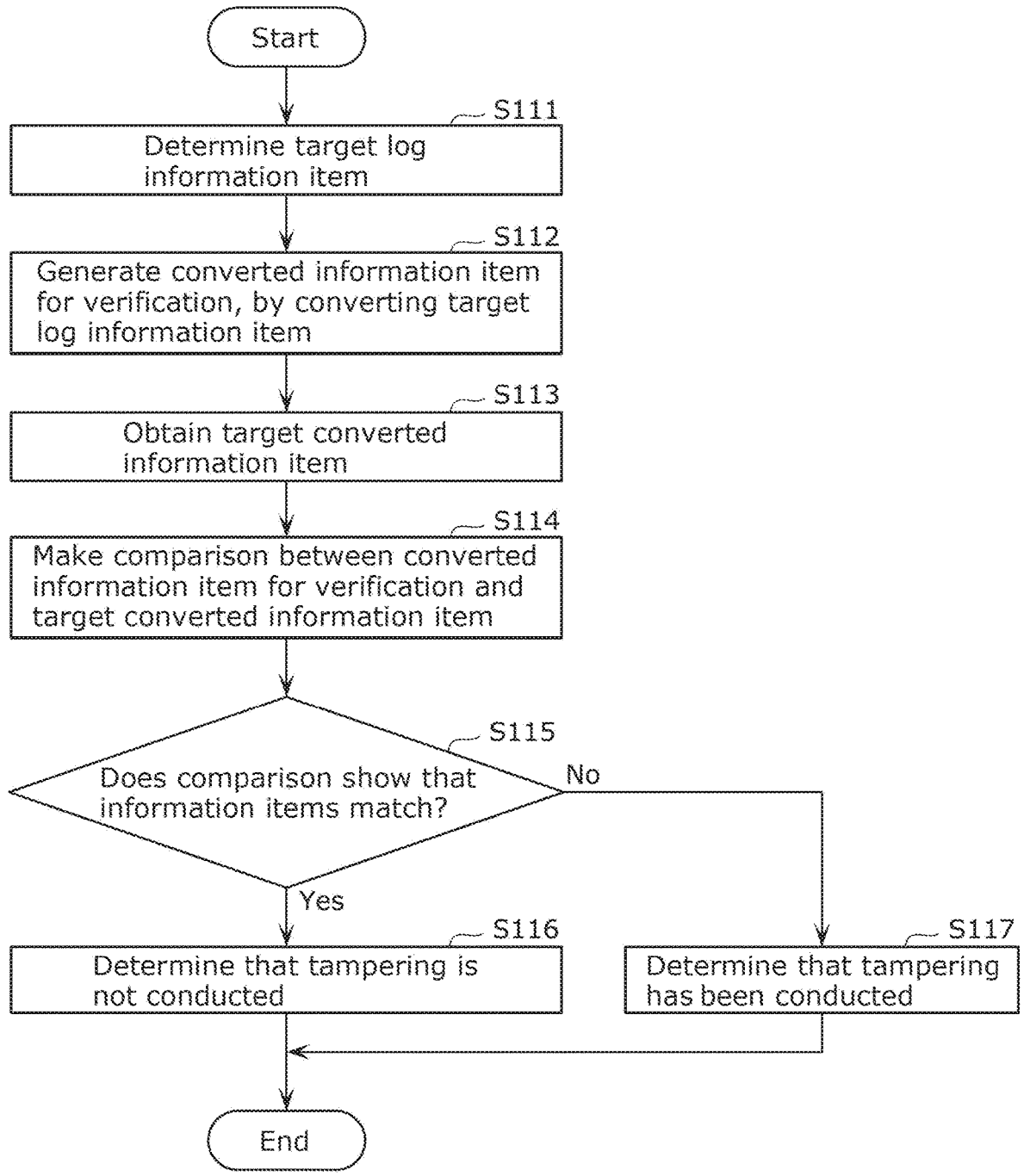
FIG. 7 is a flow chart illustrating an example of verification processing performed by the data distribution system according to the embodiment.

FIG. 7 is a flow chart illustrating an example of verification processing performed by the data distribution system according to the embodiment.

Server 20 determines a target log information item being targeted for verification based on the predetermined frequency (S111). For example, when a predetermined verification timing arrives, server 20 may randomly extract, from a plurality of log information items classified into a set determined by the table, the number (proportion) of log information items in accordance with the predetermined frequency set to the set and determine the extracted log information items as the target log information item. In this case, the higher the predetermined frequency, the larger the determined number (proportion) of log information items to be extracted. In other words, the larger the number of log information items to be randomly extracted, the higher the verification frequency of log information items that are classified into the set. In addition, for example, server 20 may determine a verification schedule with respect to each log information item at the predetermined frequency based on the table and determine a log information item for which a timing determined by the verification schedule has arrived to be the target log information item.

Next, by converting the target log information item through the predetermined conversion, server 20 generates a converted information item for verification separate from the target converted information item already stored in the blockchain (S112).

Next, server 20 obtains a target converted information item that corresponds to the target log information item from the blockchain (S113).

Next, server 20 compares the converted information item for verification with the target converted information item stored in the blockchain (S114).

In addition, when the comparison reveals that the converted information items match (Yes in S115), server 20 determines that the target log information item and the target converted information item are not tampered with (S116).

When the converted information items do not match (No in S115), server 20 determines that at least one of the target log information item and the target converted information item has been tampered with (S117).

WORKING EXAMPLES

Figure 8:
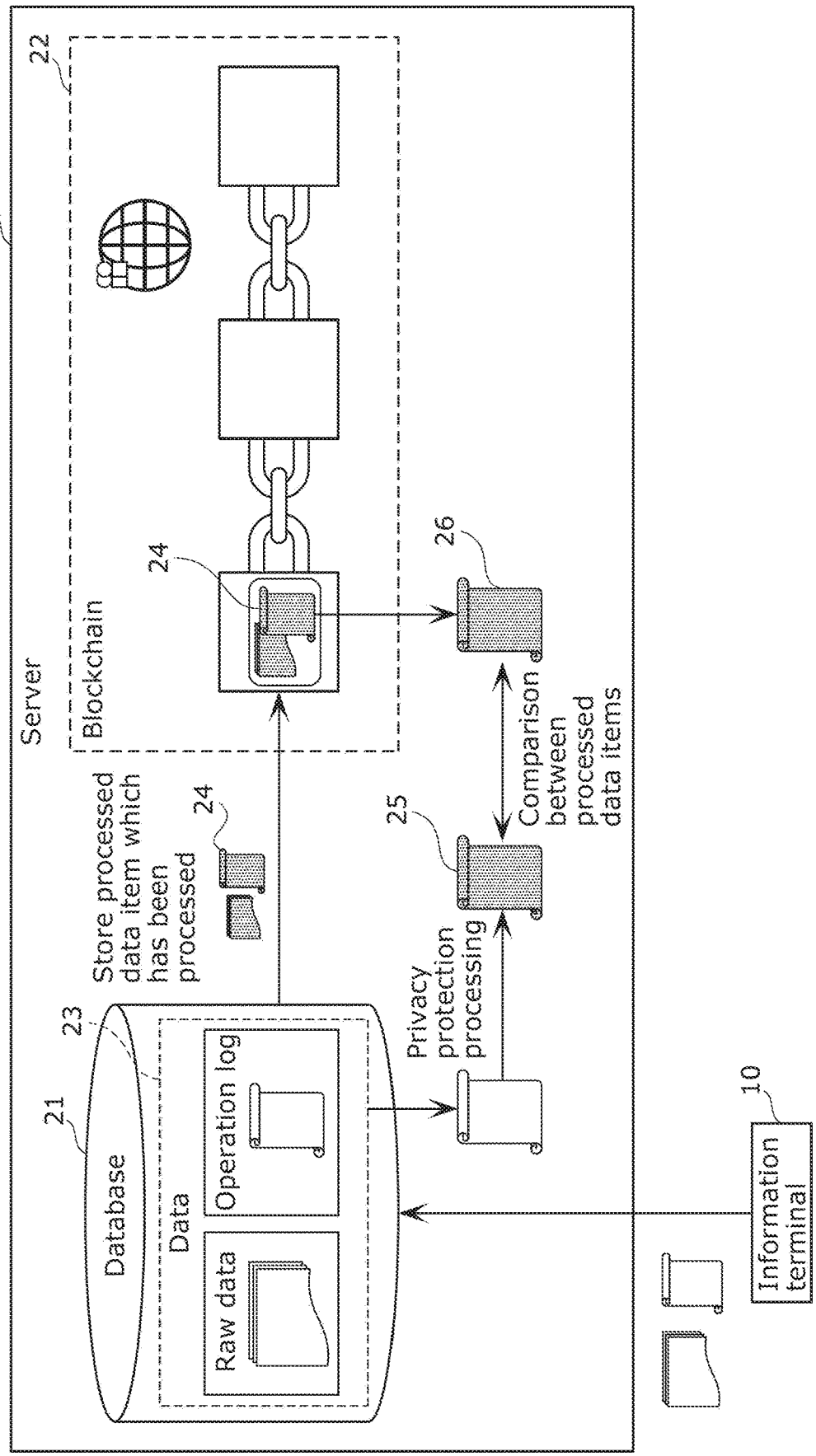
FIG. 8 is a diagram for explaining a specific example of operations of the data distribution system.
Figure 9:
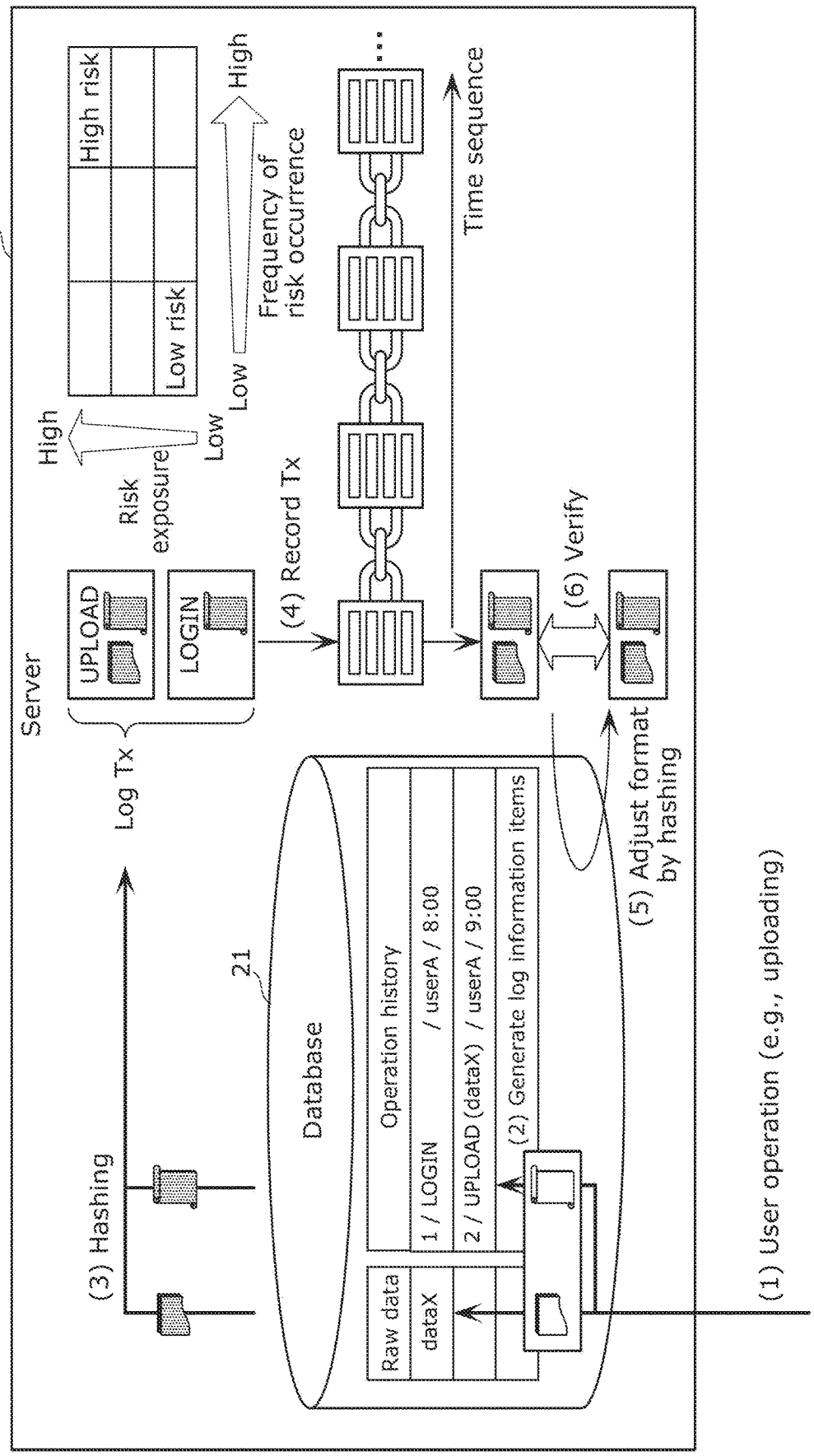
FIG. 9 is a diagram for explaining a specific example of operations of the data distribution system.

FIGS. 8 and 9 are diagrams for explaining a specific example of operations of the data distribution system.

In data distribution system 1, for example, important information such as personal data related to healthcare must be handled in a highly reliable manner among a large number of users while protecting privacy. In this case, data 23 including raw data of important information and an operation log that is an operation history in data distribution system 1 is recorded in closed database 21 which can only be used by authorized users and, at the same time, processed data 24 (converted information) having been subjected to privacy protection processing (conversion) is also recorded in open blockchain 22 which can also be viewed by other users. In other words, data 23 is constituted of a pair of data 23 not subjected to privacy protection processing and processed data 24 subjected to privacy protection processing and respectively recorded in closed database 21 and open blockchain 22. Note that database 21 is the same as database 205.

For example, as illustrated in (1) in FIG. 9, when raw data is updated by a user operation, the raw data is stored in database 21. In addition, as illustrated in (2) in FIG. 9, a log information item describing that the raw data has been updated is generated and the log information item is stored in database 21. Furthermore, as illustrated in (3) in FIG. 9, server 20 hashes the raw data and the log information item. Moreover, as illustrated in (4) in FIG. 9, server 20 records transaction data including processed data 24 generated by the hashing in the blockchain.

In addition, by performing a comparison (hereinafter, referred to as a "verification") of data 23 and processed data 24 recorded in database 21 and blockchain 22 in a state where formats of the data items are the same, tampering detection of determining whether or not any of the data items has been tampered with is performed. Specifically, as illustrated in (5) in FIG. 9, during verification, by generating processed data 25 (converted information) for verification by executing, on data 23 stored in database 21, the same processing as privacy protection processing that is performed when storing data in the blockchain, server 20 converts a format of data 23 into the same format as that of processed data 26 stored in blockchain 22. Furthermore, as illustrated in (6) in FIG. 9, server 20 performs verification by comparing processed data 25 for verification with processed data 26. Accordingly, reliability of the system itself can be indirectly enhanced without having to record important information itself in the blockchain.

For example, the privacy protection processing is hashing. In other words, as the privacy protection processing, a method may be used in which a conversion using a cryptographic hash function with respect to original data is performed in order to generate a hash value which is a unique value with respect to the original data subjected to the cryptographic hash function and which is a value that does not allow the original data to be restored from the hash value.

Unlike an external attack, it is difficult to predict when and where tampering of data due to an internal fraud may occur. In addition, since an internal fraud is a fraud committed by an authorized user, the risk is large. In order to minimize damage sustained by such tampering of data, the system is required to promptly detect tampering of data due to an internal fraud before the incident comes to light. Furthermore, when performing verification as described earlier, in order to indirectly detect tampering of data on the database, high-frequency verification must be performed for not only most recent data but also data in all storage periods.

Given that long-term storage of data is mandatory from the perspective of a system audit, it is expected that the database and the blockchain which store data items targeted for verification update and store the date items over a long period of time. Accordingly, verifying all recorded data items at a high frequency increases an amount of calculations over time and becomes a problem during a long-term operation.

Therefore, under conditions in which data stored in data distribution system 1 increases, a verification method is realized which enables reduction in the amount of calculations necessary for tampering detection by efficiently selecting a target to be verified in accordance with a type of the data and a time-series chain structure of a blockchain and by dynamically changing verification frequency.

Advantageous Effects Etc.

With the verification method according to the present embodiment, server 20 sequentially obtains, from information terminal 10, a plurality of log information items generated in information terminal 10 as a result of information terminal 10 operating. Server 20 sequentially stores, in database 205, the plurality of log information items, and sequentially stores, in a blockchain, a plurality of converted information items obtained by converting the plurality of log information items through a predetermined conversion. Server 20 conducts, at a predetermined frequency, verification as to whether at least one of a target log information item or a target converted information item has been tampered with, based on the target log information item and the target converted information item. Here, the target log information item is included in the plurality of log information items and is targeted for verification, and the target converted information item is included in the plurality of converted information items and corresponds to the target log information item. A higher frequency is determined as the predetermined frequency when a point in time at which the target converted information item was stored in the blockchain is closer to a current time at which the verification is conducted.

Accordingly, since verification of a target converted information item is conducted at a higher frequency when a point in time at which the target converted information item was stored in the blockchain is closer to a current time at which the verification is conducted, a frequency of verification of old target converted information items with a lower risk of being tampered with can be reduced. Therefore, since verification can be conducted in accordance with a risk of being tampered with, the number of verifications can be reduced so as to prevent the risk of being tampered with from increasing. Accordingly, the amount of calculations necessary for verification can be reduced.

Furthermore, in the verification method according to the present embodiment, a higher frequency is determined as the predetermined frequency when a position, in the blockchain, of a first block including the target converted information item is closer to a second block connected last to the blockchain.

Accordingly, since verification of a target converted information item is conducted at a higher frequency when a point in time at which the target converted information item was stored in the blockchain is closer to a current time at which the verification is conducted, a frequency of verification of old target converted information items with a lower risk of being tampered with can be reduced.

Furthermore, in the verification method according to the present embodiment, each of the plurality of log information items is classified into a level of importance among a plurality of levels of importance. Here, the plurality of levels of importance are determined in advance for attributes of the plurality of log information items. A higher frequency is determined as the predetermined frequency when a position, in the blockchain, of a first block including the target converted information item is closer to a second block connected last to the blockchain and when the level of importance is higher.

Accordingly, since verification of a target converted information item is conducted at a higher frequency when a point in time at which the target converted information item was stored in the blockchain is closer to a current time at which the verification is conducted, a frequency of verification of old target converted information items with a lower risk of being tampered with can be reduced. Moreover, since a level of importance of affecting the predetermined frequency is set for each attribute of log information, the higher a risk exposure of a log information item due to tampering, the higher the frequency at which verification of the log information item can be conducted.

Furthermore, in the verification method according to the present embodiment, the predetermined frequency is determined according to a table. The table is represented by a plurality of frequencies corresponding to a plurality of sets of (i) one of a plurality of ranges each classified according to a relative position in the blockchain and (ii) a level of importance among the plurality of levels of importance. Therefore, the predetermined frequency can be determined by referring to the table.

Furthermore, in the verification method according to the present embodiment, a smart contract for performing update processing is stored in the blockchain. Here, the update processing is processing of updating the plurality of frequencies that are set in the table and is performed when a block including transaction data for updating the table is stored in the blockchain.

Accordingly, the table can be automatically updated using a smart contract when transaction data is stored in the blockchain. In addition, since updating the table results in updating the predetermined frequency, a processing load necessary for the processing of updating the predetermined frequency can be reduced.

Furthermore, in the verification method according to the present embodiment, in the verification, server 20 generates a converted information item for verification, by converting the target log information item through the predetermined conversion. Server 20 makes a comparison between the converted information item for verification and the target converted information item stored in the blockchain. Server 20 determines that the target log information item and the target converted information item are not tampered with when the comparison shows that the converted information item for verification and the target converted information item match each other, and determines that at least one of the target log information item or the target converted information item has been tampered with when the comparison shows that the converted information item for verification and the target converted information item do not match each other.

Furthermore, in the verification method according to the present embodiment, the predetermined conversion is a reproducible method by which a first value is uniquely converted into a second value that forms a pair with the first value, and is an irreversible conversion by which the second value cannot be converted into the first value.

Therefore, anonymity of data stored in an open blockchain for verifying data stored in the database can be enhanced.

Other Embodiments Etc.

The present disclosure has been described thus far based on the above embodiment, but the present disclosure is not limited to the above embodiment. Such cases as below are also included in the present disclosure.

(1) While information terminal 10 is configured to transmit a plurality of log information items to server 20 in the embodiment described above, the device to transmit the plurality of log information items is not limited to information terminal 10 and may be a household electrical appliance with a communication function.

(2) While the predetermined frequency is determined based on a table in accordance with a position of a block and an attribute of a log information item in the embodiment described above, the determination of the predetermined frequency is not limited thereto and the predetermined frequency may be determined in accordance with one of the position of a block and the attribute of a log information item. In other words, when the predetermined frequency is determined in accordance with the position of a block, the attribute of a log information item need not be used to determine the predetermined frequency. In addition, when the predetermined frequency is determined in accordance with the attribute of a log information item, the position of a block need not be used to determine the predetermined frequency. Furthermore, when a higher frequency is determined when a position in the blockchain of a first block including a target converted information item is closer to a second block connected last to the blockchain, the table need not be used to determine the predetermined frequency. Moreover, when a higher frequency is further determined as the predetermined frequency when the level of importance is higher, the table need not be used.

(3) While verification of a log information item is to be performed by server 20 having a distributed ledger that stores a blockchain in the embodiment described above, verification of a log information item is not limited thereto and may be performed by an external apparatus that differs from server 20.

(4) While an example in which database 205 and distributed ledger 206 are provided in the same server 20 has been shown in the embodiment described above, database 205 and distributed ledger 206 are not limited thereto and may be provided in different apparatuses.

(5) In the embodiment described above, the frequency of verification may be determined according to the type of raw data. For example, verification frequency may be determined such that verification frequency of dynamic personal information in which raw data indicates biological information of a person is higher than verification frequency of static personal information in which raw data indicates attributes of the person.

(6) In the embodiment described above, a period during which verification is conducted may be set so that verification is conducted during a specific period of a day such as during the night. In this case, a length of the specific period may be changed depending on the day and, in such a case, the number of times verification is to be performed may be dynamically changed according to the length of the specific period. In other words, the number of verifications may be determined so that the number of times verification is conducted per unit time becomes constant.

(7) In the embodiment described above, a plurality of log information items generated during a period that precedes the current time at which the verification is conducted by a predetermined time or more may be compressed to become one archived data item. In this case, the compressed data item may be handled in a similar manner to a log information item. In other words, the compressed data item may be stored in database 205 and a hash value of the compressed data item may be stored in a blockchain.

(8) The devices in the embodiment described above are specifically computer systems each including a microprocessor, ROM, random-access memory (RAM), a hard disk unit, a display unit, a keyboard, a mouse, etc. A computer program is recorded on the RAM or hard disk unit. Each device fulfils its function as a result of the microprocessor operating according to the computer program. Here, the computer program is configured of a plurality of pieced together instruction codes indicating instructions to the computer for fulfilling predetermined functions.

(9) Some or all of the constituent elements of each device in the embodiment described above may be configured as a single system large scale integration (LSI) circuit. A system LSI is a super multifunctional LSI manufactured by integrating a plurality of units on a single chip, and is specifically a computer system including, for example, a microprocessor, ROM, and RAM. A computer program is recorded on the RAM. The system LSI circuit fulfils its function as a result of the microprocessor operating according to the computer program.

The constituent elements included in the devices described above may take the form of individual chips, or may be partially or entirely packaged into a single chip.

LSI circuits herein may also be referred to as integrated circuits (ICs), system LSI circuits, super LSI circuits, or ultra LSI circuits depending on the degree of integration. Moreover, the circuit integration method is not limited to LSI, and thus the constituent elements may be implemented using a dedicated circuit or a general-purpose processor. Field programmable gate arrays (FPGAs) that are programmable after the manufacture of LSI circuits, or reconfigurable processors with which connections or settings of circuit cells inside the LSI circuits can be reconfigured may be used.

Furthermore, when advancement in semiconductor technology or derivatives of other technologies brings forth a circuit integration technology which replaces LSI, it will be appreciated that such a circuit integration technology may be used to integrate the functional blocks. Application of biotechnology is one such possibility.

(10) Some or all of the constituent elements included in the devices described above may be configured as an IC card that is detachably attached to each device, or as a standalone module. The IC card and the module are computer systems including a microprocessor, ROM, and RAM, for example. The IC card and the module may include the super-multifunction LSI circuit described above. The IC card and the module achieve their function as a result of the microprocessor operating according to a computer program. The IC card and the module may be tamperproof.

(11) The present disclosure may be implemented as the methods described above. The present disclosure may be a computer program implementing these methods using a computer, or a digital signal including the computer program.

In addition, the present disclosure may be a computer-readable recording medium, such as a flexible disk, a hard disk, a CD-ROM, an MO, a DVD, a DVD-ROM, DVD-RAM, a Blu-ray Disc (BD; registered trademark), semiconductor memory, etc, having recording thereon the computer program or the digital signal. Furthermore, the present disclosure may be the digital signal recorded on such recording media.

In addition, the present disclosure may transmit the computer program or the digital signal via, for example, a telecommunication line, a wireless or wired communication line, a network such as the Internet, or data broadcasting.

In addition, the present disclosure may be a computer system including a microprocessor and memory, the memory may have the computer program recorded thereon, and the microprocessor may operate according to the computer program.

In addition, the present disclosure may be implemented by another independent computer system by recording the program or the digital signal on the recording medium and transporting it, or by transporting the program or the digital signal via the network, etc.

(12) The above embodiments and variations may be combined.

INDUSTRIAL APPLICABILITY

The present disclosure is applicable to verification methods, servers, and programs, and is applicable to, for example, a verification method, a server, and a program by which the amount of calculations necessary for verification can be reduced.

The invention claimed is:

1. A verification method comprising:
sequentially obtaining, from a device, a plurality of log information items generated in the device as a result of the device operating;
sequentially storing, in storage, the plurality of log information items, and sequentially storing, in a blockchain, a plurality of converted information items obtained by converting the plurality of log information items through a predetermined conversion; and
conducting, at a predetermined frequency, verification as to whether at least one of a target log information item or a target converted information item has been tampered with, based on the target log information item and the target converted information item, the target log information item being included in the plurality of log information items and targeted for verification, the target converted information item being included in the plurality of converted information items and corresponding to the target log information item,
wherein each of the plurality of log information items is classified into a level of importance among a plurality of levels of importance, the plurality of levels of importance being determined in advance for attributes of the plurality of log information items, and
a higher frequency is determined as the predetermined frequency when at least one of (i) a position, in the blockchain, of a first block including the target converted information item is closer to a second block connected last to the blockchain or (ii) the level of importance is higher.

2. The verification method according to claim 1,
wherein the higher frequency is determined as the predetermined frequency when the position, in the blockchain, of the first block including the target converted information item is closer to the second block connected last to the blockchain and when the level of importance is higher.

3. The verification method according to claim 2,
wherein the predetermined frequency is determined according to a table, and
the table is represented by a plurality of frequencies corresponding to a plurality of sets of (i) one of a plurality of ranges each classified according to a relative position in the blockchain and (ii) a level of importance among the plurality of levels of importance.

4. The verification method according to claim 3,
wherein a smart contract for performing update processing is stored in the blockchain, the update processing being processing of updating the plurality of frequencies that are set in the table and being performed when a block including transaction data for updating the table is stored in the blockchain.

5. The verification method according to claim 1,
wherein the conducting of the verification includes:
generating a converted information item for verification, by converting the target log information item through the predetermined conversion;
making a comparison between the converted information item for verification and the target converted information item stored in the blockchain;
determining that the target log information item and the target converted information item are not tampered with when the comparison shows that the converted information item for verification and the target converted information item match each other; and
determining that at least one of the target log information item or the target converted information item has been tampered with when the comparison shows that the converted information item for verification and the target converted information item do not match each other.

6. The verification method according to claim 5,
wherein the predetermined conversion is a reproducible method by which a first value is uniquely converted into a second value that forms a pair with the first value, and is an irreversible conversion by which the second value cannot be converted into the first value.

7. A server comprising:
a processor; and
memory,
wherein, using the memory, the processor:
sequentially obtains, from a device, a plurality of log information items generated as a result of the device operating;
sequentially stores, in storage, the plurality of log information items, and sequentially stores, in a blockchain, a plurality of converted information items obtained by converting the plurality of log information items through a predetermined conversion; and
conducts, at a predetermined frequency, verification as to whether at least one of a target log information item or a target converted information item has been tampered with, based on the target log information item and the target converted information item, the target log information item being included in the plurality of log information items and targeted for verification, the target converted information item being included in the plurality of converted information items and corresponding to the target log information item,
each of the plurality of log information items is classified into a level of importance among a plurality of levels of importance, the plurality of levels of importance being determined in advance for attributes of the plurality of log information items, and
a higher frequency is determined as the predetermined frequency when at least one of (i) a position, in the blockchain, of a first block including the target converted information item is closer to a second block connected last to the blockchain or (ii) the level of importance is higher.

8. A non-transitory computer-readable recording medium having stored therein a computer program for causing a computer to execute:
sequentially obtaining, from a device, a plurality of log information items generated as a result of the device operating;
sequentially storing, in storage, the plurality of log information items, and sequentially storing, in a blockchain, a plurality of converted information items obtained by converting the plurality of log information items through a predetermined conversion; and
conducting, at a predetermined frequency, verification as to whether at least one of a target log information item or a target converted information item has been tampered with, based on the target log information item and the target converted information item, the target log information item being included in the plurality of log information items and targeted for verification, the target converted information item being included in the plurality of converted information items and corresponding to the target log information item, wherein each of the plurality of log information items is classified into a level of importance among a plurality of levels of importance, the plurality of levels of importance being determined in advance for attributes of the plurality of log information items, and a higher frequency is determined as the predetermined frequency when at least one of (i) a position, in the blockchain, of a first block including the target converted information item is closer to a second block connected last to the blockchain or (ii) the level of importance is higher.

\* \* \* \* \*